United States Patent [19]

Dills

[11] 4,427,867
[45] Jan. 24, 1984

[54] POWER DIVIDER FOR MICROWAVE OVEN
[75] Inventor: Raymond L. Dills, Louisville, Ky.
[73] Assignee: General Electric Company, Louisville, Ky.
[21] Appl. No.: 446,553
[22] Filed: Dec. 3, 1982
[51] Int. Cl.³ ............................................. H05B 6/70
[52] U.S. Cl. ..................... 219/10.55 F; 219/10.55 A; 219/10.55 B; 333/105
[58] Field of Search ................. 219/10.55 F, 10.55 B, 219/10.55 R, 10.55 A, 10.55 M; 226/93 R, 101 E, 68 R; 333/105

[56] References Cited
U.S. PATENT DOCUMENTS

| | | | |
|---|---|---|---|
| 1,967,816 | 7/1934 | Fuchs | 250/40 |
| 2,909,635 | 10/1959 | Haagensen | 219/10.55 F |
| 3,400,888 | 9/1968 | Kosacheff | 236/101 E |
| 3,663,839 | 5/1972 | Low et al. | 310/4 |
| 4,010,455 | 3/1977 | Stange | 340/224 |
| 4,294,401 | 10/1981 | Diermayer et al. | 236/93 R |
| 4,354,083 | 10/1982 | Staats | 219/10.55 F |

Primary Examiner—B. A. Reynolds
Assistant Examiner—M. M. Lateef
Attorney, Agent, or Firm—Frank P. Giacalone; Radford M. Reams

[57] ABSTRACT

A microwave oven having an upper waveguide and a bottom waveguide is provided with an adjustable microwave energy deflector. The deflector is adjustable for varying the microwave energy selectively in any power ratio between the upper and lower waveguides so as to obtain a uniform distribution of energy through food masses of different sizes or temperature characteristics.

4 Claims, 4 Drawing Figures

POWER DIVIDER FOR MICROWAVE OVEN

BACKGROUND OF THE INVENTION

The present invention relates generally to microwave cooking appliances and more particularly to microwave cooking wherein microwave energy may be fed at any power ratio between a plurality of waveguides.

A problem of long standing in microwave oven appliances has been the distribution of microwave energy in the cooking cavity with respect to the type and size of food being cooked. For example with a large item to be cooked, such as a roast, it is desirable to heat both the top and bottom for best results, while for a relatively thin item to be cooked, such as bacon, the heating is more efficient with heat only on the bottom.

In an effort to alleviate the problem of microwave energy distribution, a great many approaches have been tried. One such approach in ovens having at least two waveguides fed from a single source of microwave energy is to provide a bifurcator which operates to provide a stable power split between the waveguides. Generally, this arrangement provides a fixed ratio or power split between the waveguides. While this arrangement provides satisfactory cooking results for the cooking requirements of most foods, it does not provide optimum heating or cooking for all types and sizes of food being cooked.

Another approach to the problem of microwave energy distribution is disclosed in U.S. Pat. No. 2,909,635 wherein a microwave oven with multiple cavities in which food masses of different sizes or different temperature characteristics can be placed. Multiple waveguides are used to supply microwave energy from a single source to each cavity so that simultaneous heating of such food masses results. A mode shifting device located at a common junction point of the multiple feed is also used to provide a uniform distribution of microwave energy for uniform heating of the food masses.

It is, therefore, an object of the present invention to provide in a microwave oven optimum cooking of foods having both large and small areas or volumes without excessive heating of food having smaller masses, or insufficient heating of food having larger masses.

SUMMARY OF THE INVENTION

A food cooking microwave oven is provided having an oven cavity which includes a top wall, a rear wall, side walls and an access opening. Located at the intersection of the top wall and one of the side walls is a microwave launch area. Extending from the microwave launch area and along the top wall is a first waveguide, with a second waveguide extending from the microwave launch area along the one side wall. In the present instance, a magnetron is employed as the generator for supplying microwave heating energy to the waveguides. The magnetron includes a probe that is positioned in the microwave launch area. By this invention, means are provided for selectively controlling respective amounts of the microwave heating energy to the waveguides which includes a thermally powered bimetallic deflector positioned in the microwave launch area generally intermediate the probe and the waveguides. The bimetallic deflector is powered by electric heaters that vary the flexing of the bimetallic deflector to cause its movement selectively between a position of directing most of the microwave energy into one of the waveguides or to a position of directing most of the microwave energy into the other of the waveguide to thereby control the ratio of microwave energy between the waveguides.

DETAILED DESCRIPTION

Figure 1:
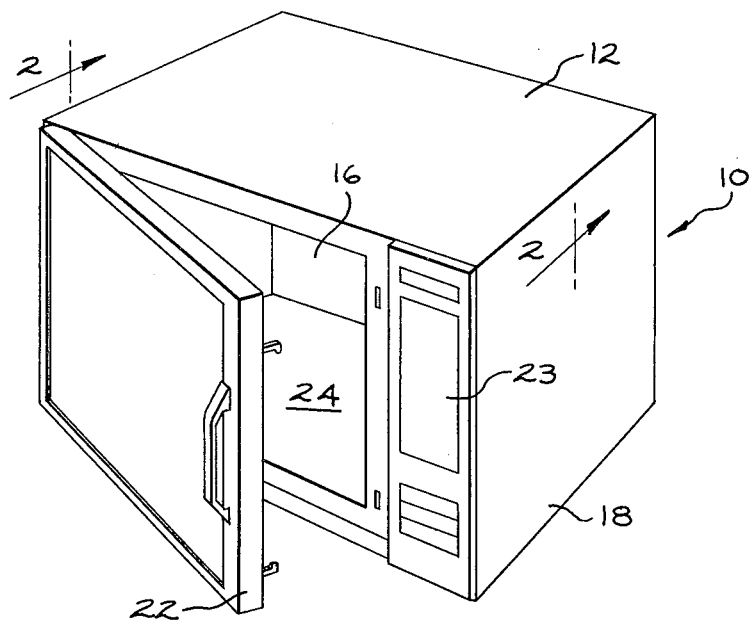
FIG. 1 is a front perspective view of a microwave oven.
Figure 2:
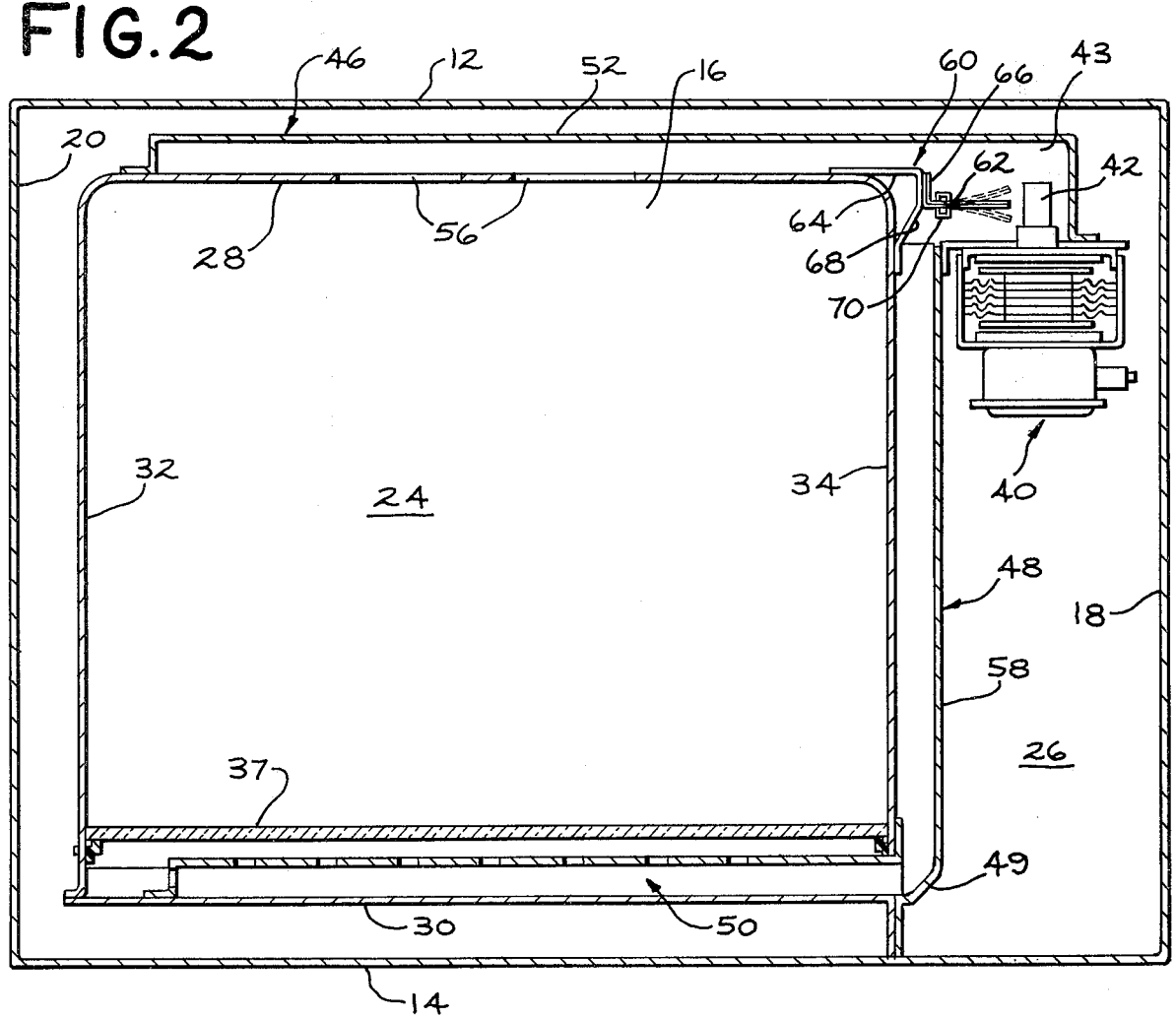
FIG. 2 is a front schematic sectional view of the microwave oven taken along lines 2—2 of FIG. 1 showing a top and bottom waveguide.

Referring to FIGS. 1 and 2, there is shown a microwave oven designated generally 10. The outer cabinet comprises six cabinet walls including upper and lower walls 12 and 14, a rear wall 16, two side walls 18 and 20, and a front wall partly formed by a hingedly supported door 22 and partly by control panel 23. The space inside the outer cabinet is divided generally into a cooking or oven cavity 24 and a control compartment 26. The cooking cavity 24 includes a conductive top wall 28, a conductive bottom wall 30, conductive side walls 32 and 34, conductive rear wall which is the cabinet wall 16, and the front wall defined by the inner face of door 22.

A support plate 37 is disposed in the lower region of cavity 24 substantially parallel to the botom walls 14 and 30 of the cabinet and cavity. The support plate 37 provides the means for supporting food objects to be heated in the cavity 24 an defines a plane hereinafter referred to as the cooking cavity.

The source of microwave energy for cavity 24 is a magnetron 40 which is mounted in control compartment 26. Magnetron 40 has its output probe 42 positioned in a housing or launch area 43. It will be understood that numerous other components are required in a complete microwave oven, but, for clarity of illustration and description, only those elements believed essential for a proper understanding of the present invention as shown are described.

Microwave energy is fed from magnetron 40 to oven cavity 24 through a coupling or transmission means such as a waveguide having a horizontally extending top branch or section 46, a vertically oriented side branch or section 48 and a horizontally extending bottom branch or section 50.

Figure 3:
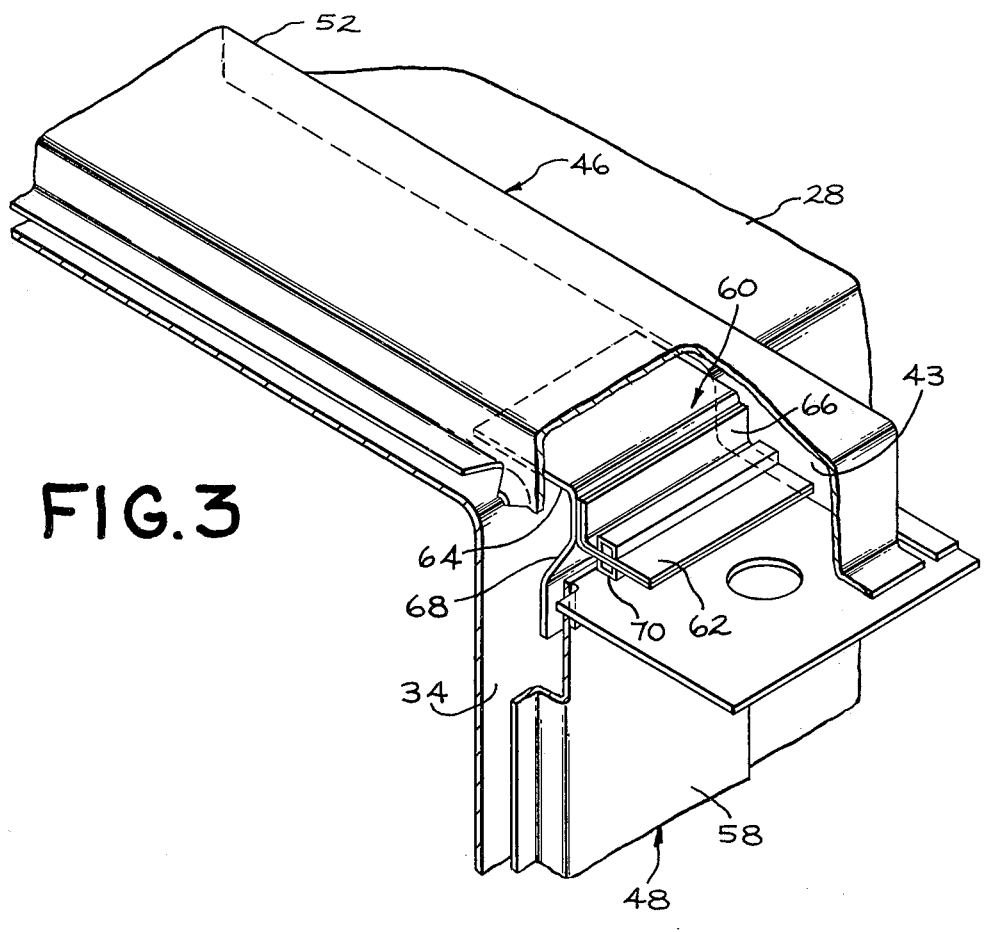
FIG. 3 is an enlarged perspective view of a portion of the microwave oven of FIG. 1 with portions removed to show the details of the deflector at the junction of the upper waveguide, side waveguide and microwave launch area.

The upper waveguide branch 46, as best seen in FIGS. 2 and 3, runs centrally of upper wall 28 of the cooking cavity and, as shown, is formed by elongated member 52 having a generally U-shaped cross section which is suitably attached to the top wall 28 of cooking cavity 24. As seen in FIG. 2, the waveguide 46 includes coupling apertures 56 located in wall 28, through which microwave energy is transmitted into the upper region of the cooking cavity 24. The waveguide extends in the direction of magnetron 40 to the housing 43 which serves as a launching area for microwave energy originating from probe 42.

The side waveguide 48 runs in a vertical direction centrally of cooking cavity side wall 34 and serves to couple the microwave energy from magnetron 40 to bottom waveguide 50. Waveguide 48 is formed generally by the side wall 34 and an elongated member 58 having a generally U-shaped cross section and is suitably attached to the side wall 20. A right angle bend is formed by wall portion 49 at the lower end of section 48 to efficiently couple energy from waveguide 48 to waveguide 50.

Microwave energy from housing or launch area 43 in the vicinity of probe 42 of magnetron 40 is split between waveguide 46 and waveguide 48 by a deflector bifurcator 60 which operates to provide a power split between these waveguides. Bifurcator 60 is positioned at the junction of the three waveguide sections comprising waveguide sections 46, 48 and launch area 43.

The microwave oven so far described, including the combination of upper and lower waveguide configuration, is fully disclosed in U.S. Pat. No. 4,354,083—Staats and in pending application Ser. No. 411,153—Bakanowski et al, filed Aug. 25, 1982, both assigned to the General Electric Company, the assignee of the present invention.

By the present invention, means are provided wherein a particular mode of energy distribution is established so that food of varying masses may be cooked by the penetration of energy into the food mass in a well-known manner. If foods have a larger volume, the amount of energy required to brown the bottom portion within a particular period of time is greater than food having a smaller volume. In this instance, a greater percentage of energy is deflected into the bottom waveguide section.

In addition to making the cooking time of the two food masses more nearly equal, it is also desirable to bring about a uniform distribution of energy, so that cooking will be uniform throughout the mass of each food.

The means for providing the microwave energy distribution includes bifurcator 60 which, as will be explained fully, deflects microwave energy so as to cause a uniform distribution of energy through food masses of different sizes or different temperature characteristics.

To this end, the bifurcator 60 is positioned in the housing 43 at the junction of the three waveguide sections comprising guide sections 46, 48. The bifurcator 60 includes a body or deflector portion 62 constructed of a bimetallic strip, such as one constructed of an iron alloy on one side and a nickel alloy on the other. The bimetallic deflector portion 62 is mounted on a bracket or support member 64 secured to the cooking cavity 24 at the junction of the top wall 28 and side wall 32. The deflector is arranged with its width direction perpendicular to the propagation direction of the energy in the waveguide system. The width of the deflector is adapted to the width of the waveguide so that maximum reflection is achieved. The length direction of the relatively thin bimetallic deflector portion 62 extends substantially horizontally from the mounting bracket 64 toward the magnetron probe. The support member 64 is formed to provide a step 66 which, together with the horizontally extending portion 62, functions as a quarter-wave transformer to efficiently match the impedance of waveguide 46 to launch area 43 for maximum power transfer. The lower portion of bracket 64 provides a conventional mitered corner at 68 for proper impedance matching with side waveguide 48.

In its normal position of the bifurcator 60 as seen in FIG. 2, satisfactory cooking results for most foods are achieved by providing 60% of the energy to the top waveguide 46 and 40% to the bottom waveguide 50, via waveguide 48. The deflector 62 is driven from its normal position by a heater 70. The heater 70 drives the deflector 62, thereby changing the angle of the reflecting surface of the deflector with respect to the incoming wave of the high-frequency energy. The incoming wave striking the reflecting surface of deflector 60 distributes the microwave energy between waveguides 46 and 48. The lengths of paths taken by the portion of the incoming wave distributed between waveguides 46 and 48 are changed with respect to the position of the deflector.

The position of the bimetallic deflector 62 relative to the top and bottom waveguides is determined by the amount of heat generated by the heater 70. For proper operation of the microwave oven in accordance with the present invention, it is necessary that the amount of heat applied to the heater 70 be controlled in accordance to the type food to be cooked. While it is necessary that the heat applied to the bimetallic deflector is controlled, the exact manner of accomplishing this varying heat is not critical. The control shown in FIG. 4 is representative of one such control.

Figure 4:
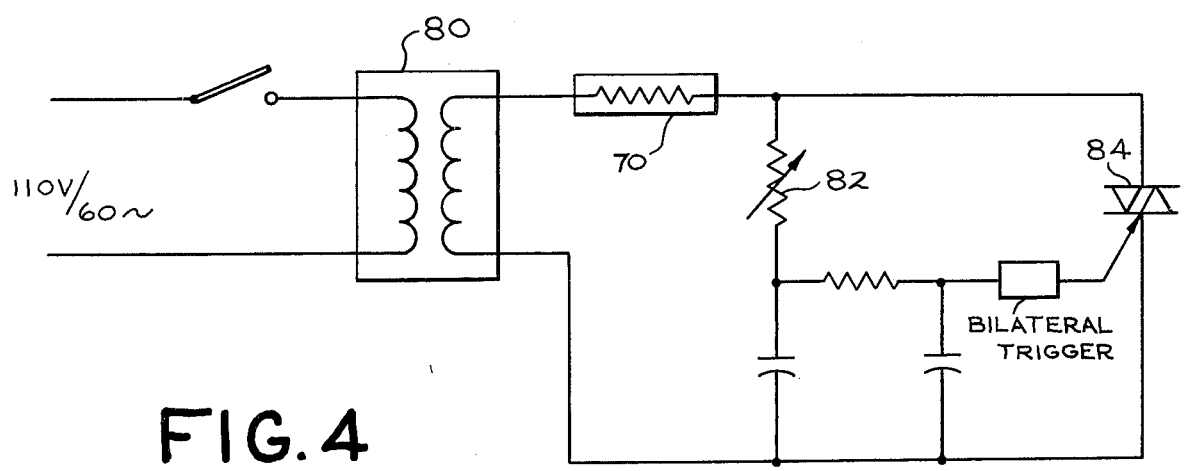
FIG. 4 is a schematic view of a control system adapted for use in controlling distribution of microwave energy between the top and bottom waveguides.

Referring now to FIG. 4, there is shown a control circuit wherein the amount of heat applied to the bimetallic deflector 62 by heater 70 is a function of the amount of time the heater 70 is energized in each cycle. Power to the control circuit and heater 70 is supplied from a 110 V/60 v power source through an isolation transformer 80. The ON time of heater 70 during each cycle and, accordingly, the amount of heat applied to bimetallic deflector 62 is determined generally by variable resistor 82 and a phase control triac 84. The user of the microwave oven selects a mode of operation based on the type food to be cooked and in so doing adjust the variable resistor 82. This adjustment of variable resistor 82 translates in terms of the amount of ON time the heater 70 is energized through the phase control triac 84. The adjusted value of variable resistor 82 determines the firing angle of the triac 84 so that at minimum selected resistance the deflector 62 may be positioned to deflect 75% of the microwave energy to the top waveguide and 25% microwave energy to the bottom waveguide, and at minimum selected resistance the deflector 62 may be positioned to deflect 25% of the microwave energy to the top waveguide and 75% of the microwave energy to the bottom waveguide.

The method employed for controlling operation of the heater 70 and accordingly the positioning of deflector 62 relative to the waveguides may vary in accordance with the overall microwave oven control system. In one instance or mode of operation, the bimetallic deflector in its normal position, as explained above, remains unheated, and heat may be applied only to drive the deflector 60 upwardly from its normal horizontal position to divert a greater percentage of microwave energy to bottom waveguide 50 through side waveguide 48. In another instance or mode of operation, the bimetallic deflector 62 is maintained in its normal horizontal position, as explained above, by providing partial heat thereto. Heat is increased to drive the deflector 62 upwardly from its normal horizontal position to divert a greater percentage of microwave energy to the bottom waveguide 50, and, in the alternative, heat is decreased to allow the deflector 62 to move downwardly from its normal horizontal position to decrease the amount of microwave energy entering the bottom waveguide 50.

In summary, by the present invention means are provided in a microwave oven incorporating multiple waveguides which permit selective deflection of the microwave energy between the waveguides in accordance with the type food to be cooked. The present arrangement allows a desired degree of browning of food independent of the food mass without increasing its cooking time. The deflection of the bimetallic member 62 may be preselected depending on the type of food to be cooked, or the deflection can be variable and changing during the cooking cycle, depending on the degree of browning and cooking of the food. The exact method of controlling the positioning of the deflector is not critical to the operation of this invention.

It should be apparent to those skilled in the art that the embodiment described heretofore is considered to be the presently preferred form of this invention. In accordance with the patent statutes, changes may be made in the disclosed apparatus and the manner in which it is used without actually departing from the true spirit and scope of this invention.

What is claimed is:

1. A food cooking microwave oven comprising:
   an oven cavity including a top wall, a rear wall, side walls and an access front opening;
   a housing at the intersection of said top wall and one of said side walls;
   a first waveguide extending from said housing along said top wall;
   a second waveguide extending downwardly from said housing along said one of said side walls and said bottom wall;
   microwave generator means including a probe in said housing being operable for supplying microwave heating energy to said waveguides;
   means for selectively controlling respective amounts of said microwave heating energy to said first waveguide and said second waveguide including:
   a bifurcator positioned in said housing intermediate said probe and said first and second waveguides having a thermally powered bimetallic deflector means;
   heating means arranged on said bimetallic deflector of said bifurcator for applying heat to said deflector, control means including selector means operable to control the output of said heating means to vary the flexing of said bimetallic deflector relative to said waveguide to cause its movement selectively between a position of directing most of said microwave energy into said first waveguide to a position of directing most of said microwave energy into said second waveguide to thereby control the ratio of microwave energy between said first waveguide and said second waveguide.

2. The food cooking microwave oven recited in claim 1 wherein said bifurcator further includes a mounting bracket mounted on the outer wall of said cavity adjacent the intermediate intersection of said top wall and said one of said side walls, said deflector means being arranged on said bracket whereby in its normal position said deflector means extends substantially horizontally towards said probe whereby 60% of the microwave energy is directed to said first waveguide and 40% of the microwave energy is directed to said second waveguide.

3. The food cooking microwave oven recited in claim 2 wherein said heating means is operable for moving said bimetallic deflector means from its normal substantially horizontally disposed position of directing 40% of the microwave energy to said second waveguide toward a position of increasing the microwave energy directed thereto.

4. The food cooking microwave oven recited in claim 2 wherein said heating means is operable for applying partial heat to said deflector in maintaining it in said normal position, and for varying said heat to cause movement of said deflector between a position of directing most of said microwave energy into said first waveguide to a position of directing most of said microwave energy into said second waveguide to thereby control the ratio of microwave energy between said first and second waveguides.

* * * * *